UNITED STATES PATENT OFFICE 2,546,762

ACYLAMINO ACETOPHENONES AND PREPARATION THEREOF

Loren M. Long, Grosse Pointe Woods, Mich., assignor to Parke, Davis & Company, Detroit, Mich., a corporation of Michigan No Drawing. Application August 24, 1948, Serial No. 45,975

5 Claims. (Cl. 260—562)

This invention relates to nitrogen containing ketones and to methods for obtaining the same. More particularly, the invention relates to ω-aminoacetophenone derivatives having the general formula,

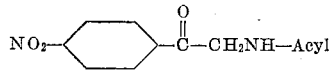

where acyl as used herein includes lower aliphatic acyl, halogen substituted lower aliphatic acyl, benzoyl, substituted benzoyl and araliphatic acyl radicals.

In accordance with the invention an ω-haloacetophenone-hexamethylene tetramine complex is hydrolyzed with mineral acid in an aqueous or non-aqueous reaction medium and the inorganic mineral acid salt of the ω-aminoacetophenone so obtained simultaneously neutralized and acylated to obtain the corresponding ω-acylamidoacetophenone. These transformations may be diagrammatically illustrated as follows:

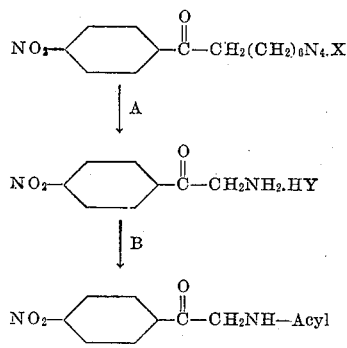

where HY represents one equivalent of an inorganic mineral acid, X is a halogen atom and acyl has the same significance given above.

In carrying out the hydrolysis step represented by A in the above diagram any mineral acid can be used. For example, hydrochloric, hydrobromic, hydriodic, sulfuric or phosphoric acids can be employed. Regardless of the acid selected as the hydrolysis catalyst the ω-aminoacetophenone acid addition salt formed consists principally of the salt corresponding to the acid used in the hydrolysis. For the best yields of the desired products it is preferable to use an alcoholic reaction medium. The function of the alcohol present in such reaction media is to remove the formaldehyde formed in the reaction as the acetal and thus prevent its reaction with either the starting material or final product. Reaction mixtures consisting of or containing alcohols such as methanol, ethanol, n-propanol, isopropanol, n-butanol and the like produce particularly good results.

The hydrolysis reaction can be carried out at temperatures varying from about 0 to 110° C. However, I prefer to use a temperature of about 20 to 30° C. since in this temperature range the reaction proceeds at a reasonable rate and the danger of decomposition of the starting material and/or the final product is almost at a minimum.

In acylating the ω-aminoacetophenone compounds, shown by B in the above diagram, an acid addition salt of the ω-aminoacetophenone compound must be employed as the starting material since the free bases of these amino ketones are extremely unstable. However, in order for the acylation reaction to take place the ω-aminoacetophenone compound must be in the form of its free base and it is therefore necessary to generate simultaneously the free base in the reaction mixture and to acylate it. This is accomplished by carrying out the reaction in the presence of a weakly alkaline substance such as an alkali metal salt of an organic acid, an alkali or alkaline earth metal carbonate or bicarbonate, a tertiary organic base, a hydroxide of an amphoteric metal, calcium hydroxide and the like. Some specific examples of such weakly alkaline substances are sodium acetate, sodium bicarbonate, potassium bicarbonate, sodium carbonate, calcium carbonate, magnesium carbonate, pyridine, quinoline, triethylamine and aluminum hydroxide.

As acylating agents acyl halides or acyl anhydrides can be employed in conjunction with either aqueous or non-aqueous reaction mediums. The temperature of the reaction is not particularly critical and can be varied over a considerable range without any significant deleterious effect upon the yields of the final products. In general, temperatures varying from 0° C. to at least 110° C. can be used although when a non-aqueous reaction mixture is employed the temperature can be increased if desired.

The products of the invention are particularly useful as intermediates in the synthesis of organic compounds possessing antibiotic activity. For example, the products produced in the subsequent example can be converted to (1)-ψ-1-p-nitrophenyl-2-dichloroacetamidopropane-1,3-diol, a compound possessing outstanding and unique antibiotic properties, by the methods described in my copending application, now Patent No. 2,515,239, issued July 18, 1950, and in the copending application of Crooks et al., Serial No. 15,264, filed March 16, 1948, now Patent No. 2,483,884 issued October 4, 1949.

*Example*

(a) 71 g. of p-nitro-ω-bromoacetophenone dissolved in 300 cc. of chloroform is added to a solution of 46 g. of hexamethylene tetramine in 600 cc. of chloroform. The solid product begins to separate almost immediately and the temperature of the reaction mixture rises to about 50° C. After allowing the mixture to stand for about two hours the p-nitro-ω-bromoacetophenone-hexamethylene tetramine complex is collected, washed with a little choroform and dried. The formula of this product is:

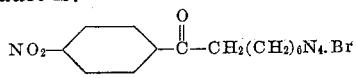

The p-nitro-ω-bromoacetophenone-hexamethylene tetramine complex prepared above is mixed with a cold solution of 500 cc. of absolute ethanol and 100 cc. of concentrated hydrochloric acid and the mixture stirred overnight at room temperature (about 25° C.). The solid product which consists of the hydrochloride salt of p-nitro-ω-aminoacetophenone contaminated with minor amounts of the hydrobromide salt and ammonium chloride is collected, washed with 200 cc. of ice cold water to remove the ammonium chloride and dried. The formula of this compound is:

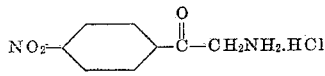

(b) 46 g. of the p-nitro-ω-aminoacetophenone hydrochloride prepared above is mixed with 200 cc. of acetic anhydride and 25 g. of sodium bicarbonate. The mixture is stirred at room temperature and small quantities of ice and water added from time to time. Stirring is continued until the mixture becomes clear and reaches a temperature of about 70° C. The solution is diluted with 900 cc. of water, cooled to 5° C. and the p-nitro-ω-acetamidoacetophenone collected; M. P. 158–161° C. p-Nitro-ω-acetamidoacetophenone has the formula,

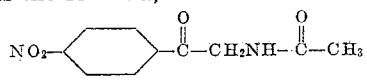

(c) 26 g. of p-nitro-ω-aminoacetophenone hydrochloride prepared as described in (a) is mixed with about 21 g. of acetic anhydride and 4.5 g. of sodium bicarbonate and the mixture heated at 70° C. with stirring on a steam bath. The reaction mixture is cooled, poured into about 600 cc. of ice water and the product which precipitates collected. The p-nitro-ω-acetamidoacetophenone thus obtained is washed well with cold water and dried. This product is identical with the material prepared by the method described in (b) above.

(d) A mixture consisting of 12.4 g. of p-nitro-ω-aminoacetophenone hydrochloride, 50 g. of benzoic anhydride and 6 g. of dry sodium acetate is heated to about 45° C. and stirred as small amounts of ice and water are added from time to time. After about one hour, the mixture is diluted with 300 cc. of water, cooled, adjusted to pH 8 with sodium hydroxide and the p-nitro-ω-benzamidoacetophenone collected. After washing with water, this product which has the formula,

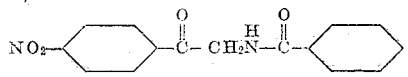

is dried in vacuo.

(e) A mixture consisting of 12.4 g. of p-nitro-ω-aminoacetophenone hydrobromide, 50 g. of p-nitrobenzoyl chloride and 8 g. of sodium bicarbonate is treated with about 25 cc. of ice water and stirred vigorously for about one hour keeping the temperature below 75° C. 300 cc. of ice water is added, the mixture adjusted to pH 8 with sodium hydroxide and stirred for about one hour. The solid p-nitro-ω-p′-nitrobenzamidoacetophenone is collected, washed well with water and dried in vacuo. The formula of this compound is:

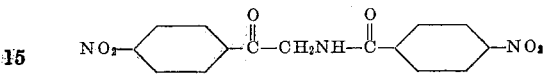

(f) 6.2 g. of p-nitro-ω-aminoacetophenone hydrobromide is added to a rapidly stirred mixture consisting of 8 g. of pyridine and 22 g. of dichloroacetyl chloride keeping the temperature below about 5° C. After the addition has been completed the mixture is stirred for a short time and then 100 cc. of ice water added. The solid product is collected, washed well with water and dried in vacuo. The product thus obtained is p-nitro-ω-dichloroacetamidoacetophenone of formula,

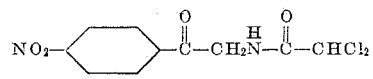

The ω-haloacetophenone-hexamethylene tetramine complexes used as starting materials in the practice of the invention may be prepared by reacting an ω-haloacetophenone compound with hexamethylene tetramine in an inert organic solvent. A specific example of the preparation of the ω-bromoacetophenone-hexamethylene tetramine complex by this method is shown in Example is shown in Example (a) above.

What I claim is:

1. A compound of the formula,

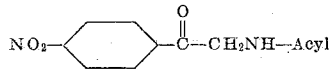

said acyl being a carboxylic acid acyl radical.

2. p-Nitro-ω-acetamidoacetophenone.
3. p-Nitro-ω-dichloroacetamidoacetophenone.
4. Process for obtaining a nitroacylamidoacetophenone having the formula,

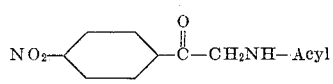

which comprises reacting a nitrohaloacetophenone of formula,

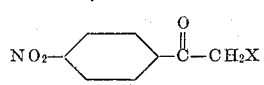

with hexamethylenetetramine to obtain a compound having the formula,

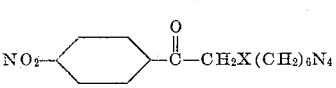

hydrolyzing said compound with an inorganic mineral acid to obtain an acid addition salt of a nitroaminoacetophenone of formula,

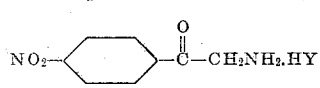

and thereafter simultaneously neutralizing and acylating said nitroaminoacetophenone acid addition salt by treating it with an acylating agent in the presence of a weakly alkaline substance thereby obtaining said nitroacylamidoacetophenone, where X is a halogen atom, HY represents one equivalent of an inorganic mineral acid, and acyl is a carboxylic acid acyl radical.

5. Process for obtaining p-nitro-ω-acetamidoacetophenone which comprises reacting p-nitro-ω-bromoacetophenone with hexamethylenetetramine thereby obtaining p-nitro-ω-bromoacetophenone-hexamethylenetetramine complex, hydrolyzing said compound with hydrochloric acid to obtain the hydrochloride salt of p-nitro-ω-aminoacetophenone and thereafter treating with acetic anhydride in the presence of a weakly alkaline substance and separating p-nitro-ω-acetamidoacetophenone having the formula,

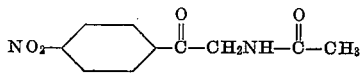

LOREN M. LONG.

REFERENCES CITED

The following references are of record in the file of this patent:

UNITED STATES PATENTS

| Number | Name | Date |
|---|---|---|
| 2,128,255 | Krzikalla et al. | Aug. 30, 1938 |
| 2,245,282 | Legerlotz | June 10, 1941 |

OTHER REFERENCES

Gabriel: Ber. deut. Chem., vol. 43 (1910), pp. 1283–1287.

Gabriel: Ber. deut. Chem., vol. 54 (1921), pp. 1067–1078.

Mannich et al.: Chemical Abstracts, vol. 33 (1939), p. 6273; (abstract of "Arch. Pharm.," vol. 277 (1939).